United States Patent
Vapnik et al.

(10) Patent No.: US 6,269,323 B1
(45) Date of Patent: *Jul. 31, 2001

(54) SUPPORT VECTOR METHOD FOR FUNCTION ESTIMATION

(75) Inventors: Vladimir Naumovich Vapnik, Middletown; Steven Eugene Golowich, New Providence, both of NJ (US)

(73) Assignees: AT&T, New York, NY (US); Trustees of Princeton University, Princeton, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/846,039

(22) Filed: Apr. 25, 1997

Related U.S. Application Data

(63) Continuation-in-part of application No. 08/726,452, filed on Oct. 4, 1996, now Pat. No. 5,950,146.

(51) Int. Cl.$^7$ .................................................. G06E 1/00
(52) U.S. Cl. ............................ 702/154; 702/153; 706/20; 706/25
(58) Field of Search .................................. 702/153, 154; 706/20, 25, 16

(56) References Cited

U.S. PATENT DOCUMENTS

| | | | |
|---|---|---|---|
| 5,640,492 | * | 6/1997 | Cortes et al. ........................... 395/23 |
| 5,950,146 | * | 9/1999 | Vapnik ................................. 702/153 |

OTHER PUBLICATIONS

Jeffrey A. Fessler, Improved PET Quantification Using Penalized Weighted Least–Squares Image Reconstruction, submitted to IEEE Transactions on Medical Imaging, pp. 1–33, Jul. 13, 1992.

G. T. Herman, Image Reconstruction From Projections, Real–Time Imaging 1, pp. 7–15, (1995).

Paul E. Kinahan et al., A Comparison of Transform and Iterative Reconstruction Techniques for a Volume–Imaging PET Scanner with a Large Axial Acceptance Angle, IEEE Transactions on Nuclear Science, vol. 42, No. 6, pp. 2281–2287 (1995).

Y. Vardi, et al., A Statistical Model for Positron Emission Tomography, J. of the American Statistical Association, vol. 80, No. 389, pp. 8–20 (Mar. 1995).

* cited by examiner

Primary Examiner—Kamini Shah

(57) ABSTRACT

A method for estimating a real function that describes a phenomenon occurring in a space of any dimensionality is disclosed. The function is estimated by taking a series of measurements of the phenomenon being described and using those measurements to construct an expansion that has a manageable number of terms. A reduction in the number of terms is achieved by using an approximation that is defined as an expansion on kernel functions, the kernel functions forming an inner product in Hilbert space. By finding the support vectors for the measurements one specifies the expansion functions. The number of terms in an estimation according to the present invention is generally much less than the number of observations of the real world phenomenon that is being estimated. In one embodiment, the function estimation method may be used to reconstruct a radiation density image using Positron Emission Tomography (PET) scan measurements.

24 Claims, 2 Drawing Sheets

SUPPORT VECTOR METHOD FOR FUNCTION ESTIMATION

This is a continuation-in-part application of U.S. patent application Ser. No. 08/726,452 filed Oct. 4, 1996, now U.S. Pat. No. 5,950,146.

The U.S. Government has a paid-up license in this invention and the right in limited circumstances to require the patent owner to license others on reasonable terms as provided for by the terms of Grant No. PHY 9512729 awarded by the N.S.F.

FIELD OF INVENTION

This invention relates to the fields of function approximation, regression estimation and signal processing. More particularly, the invention relates to practical methods for estimating functions of any dimensionality. This invention has particular utility in the reconstruction of images associated with Positron Emission Tomography (PET) scan data.

BACKGROUND OF THE INVENTION

Function estimation is a branch of mathematics having many real world applications. For example, function estimation may be applied to a finite number of noisy measurements (or "observations") for the purpose of approximating a function that describes the phenomenon being measured. Existing techniques of function estimation generally use the expansion:

$$f(x) = \sum_{i=1}^{N} \alpha_i \phi_i(x) \tag{1}$$

where $f(x)$ is the approximating function, $\phi_i(s)$ are a plurality of a priori chosen functions, $\alpha_i$ are scalars, and "N" is the number of terms in the expansion. Accordingly, to estimate a function using equation (1), one must estimate the scalars $\alpha_i$. The equation may be readily applied to one or two dimensional data, however its application to data of three or more dimensions is limited by the "curse of dimensionality".

The curse of dimensionality is well known among mathematicians. It refers to the exponential increase in complexity of the estimating function that occurs as the dimensionality of the data being estimated increases. For example, if a one dimensional curve may be estimated with reasonable accuracy by using 20 terms (N=20), then the estimation of a two dimensional surface with reasonable accuracy requires $20^2$ terms (N=$20^2$). A three dimensional surface requires $20^3$ terms, and so on. Thus, as the dimension of the function to be estimated increases, the number of terms required rapidly reaches the point where even the most powerful computers can not handle the estimation in a timely manner.

Positron Emission Tomography (PET) is a graphical method of recording the physiological processes of the body. A tracer labelled with a positron emitting nuclide is injected into the body, and an image of the distribution of radioactivity which follows is reconstructed from the measured positron emissions.

There are two classes of image reconstruction algorithm used in PET. Direct analytical methods because they require relatively short computation times. Images reconstructed by analytical methods tend to have low visual quality and display interference between regions of low and high tracer concentration. Iterative methods generally produce higher visual quality, but are computationally much more intensive. At present, the computation time of reconstruction using iterative methods is unacceptably long.

At present, analytical and iterative methods require the problem to be discretized at some stage. This means that the activity concentration is calculated at a finite number of points from a finite number of projections. The area to be reconstructed is subdivided into a mesh of pixels, and the activity concentration within each pixel is assumed to be uniform. The lines of response are rays of a finite width which depends on the detectors' resolution. The "coincidence counts" for each line of response are proportional to the line integral of the tracer concentration. The Radon transform operator, $R[f(x,y)]$ defines the integral of $f(x,y)$ along a line, and analytical methods approximate the inverse Radon operator to determine the function f.

Filtered Back Projection (FBP) is an analytical PET image reconstruction method in which the emission data is first frequency filtered and is then back-projected into the image space. Back-projection of unfiltered emission data, p, is known as simple back-projection. Back-projection of p assigns a value which is proportional to the number of coincidence counts for a line of projection to each pixel through which that line passes. The resulting image is a star like pattern, with pixel values peaking at the position of the source. This means that nearby pixels will have non-zero values although no tracer is present at that location. The star-like image may be significantly reduced by initial frequency filtering of the emission data. The peak is principally composed of high-frequency components, while areas outside the peak are composed of low-frequency components. High-pass frequency filtering the emission data amplifies the high-frequency components relative to the low-frequency components, and the back-projection of the filtered projection data is of higher visual quality.

Iterative methods of reconstruction require that the emission data is discretized before solution of the reconstruction problem. A finite-dimensional algebraic system of linear equations are solved by some iterative method. Iterative methods of reconstruction are more flexible than analytical methods because weights or penalties which reflect the nature of the problem may be introduced into the set of linear equations. For example, additional constraints and penalty functions can be included which ensure that the solution has certain desired properties, such as requiring that values of neighboring pixels should be close to one another.

Iterative PET image reconstruction methods may be divided into three classes: Norm Minimizations, Maximum Likelihood Approaches, and Maximum A Posteriori Approaches. The prior art includes many Norm Minimization methods, although those which involve factorization of the matrix are usually unsuitable because of the size of the computational power required for solution. One set of norm minimization method, Algebraic Reconstruction Techniques, or Row Action Methods, are relaxation methods which require access to only one row of matrix per iteration. Maximum Likelihood Approaches (MLAs) maximize the conditional probability of observing the coincidence counts over all possible image vectors. MLA models which assumes the emission process has a Poisson distribution are considered to be the most appropriate to PET reconstruction, and are usually solved by the expectation maximization (EM) iterative method. Maximum A Posteriori Approach (MAPA) models maximize the conditional probability of the image vector given the measurement vector or observed coincidences. MAPA models require that the a priori probability distribution of the images is known, which has been considered a drawback. A recent comparison of the various iterative methods of PET image reconstruction concluded that a Maximum Likelihood Approach using EM methods best characterized the emission process and were the most promising direction for further PET image reconstruction research.

SUMMARY OF THE INVENTION

The present invention provides a method for approximating functions of any dimensionality by an estimating function having a manageable number of terms. The reduction in the number of terms is achieved by using the expansion:

$$f(x) = \sum_{i=1}^{l} a_i K(x, x_i) + b \quad (2)$$

where $K(x,x_i)$ is a positively defined kernel function having two vector variables that define an inner product in some Hilbert space. The $a_i$ are scalars, and the $x_i$ are subsets of the measured data called support vectors (SVs). The number of terms required when approximating a function with this expansion depends on the complexity of the function being estimated and on the required accuracy of the approximation, but not on the dimensionality of the function being estimated. The invention allows the PET image reconstruction problem to be solved efficiently using a novel Norm Minimization approach.

DETAILED DESCRIPTION

The SV Method for Estimation of Real Functions

Figure 1:
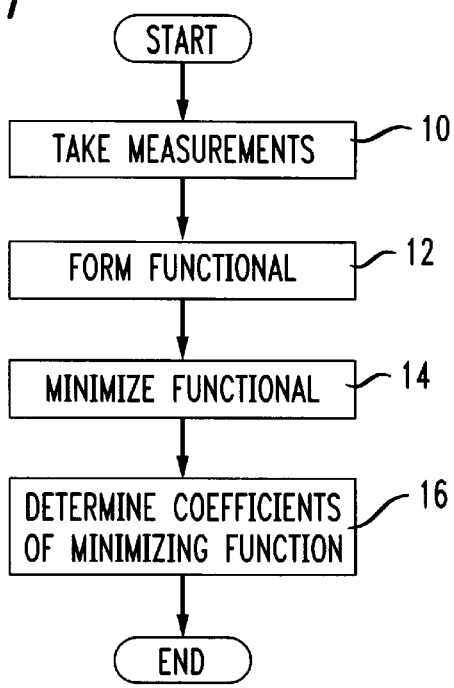
FIG. 1 is a flow chart depicting the steps taken in using the support vector method for estimating a function according to the present invention.

FIG. 1 is a flow chart depicting the steps taken in estimating a real function according to the present invention. The real function to be estimated will generally be descriptive of some physical phenomenon that occurs in an "n" dimensional space. Accordingly, the first step in estimating a real function is to take measurements of the phenomenon that is to be described by the estimated function (step 10). For purposes of illustration, the number of measurements is assigned the symbol l. Each of the l measurements is described by a vector "x" and a value "y". The vector $x_i$ describes the position within the n dimensional space at which the $i^{th}$ measurement occurs, and therefore x is an n dimensional vector. The value $y_i$ describes the value of the $i^{th}$ measurement. Thus, the measured data is denoted as $(x_1,y_1), (x_2,y_2) \ldots (x_l,y_l)$.

Once the measurements have been acquired, the following functional is formed (step 12) and minimized (step 14):

$$R(\omega) = C \sum_{i=1}^{l} |y_i - f(\chi_i, \omega)|_l + (\omega, \omega), \quad (3)$$

$$|y - f(\chi, \omega)|_l = \begin{cases} 0 & \text{if } |y - f(x, \omega)| < \varepsilon, \\ |y - f(x, \omega)| - \varepsilon & \text{otherwise} \end{cases} \quad (4)$$

$(\omega,\omega)$ is the inner product of two vectors, C is some constant, and $f(x,\omega)$ is a set of functions that can be represented by:

$$f(x, \omega) = \sum_{i=1}^{\infty} \omega_i \phi_i(x) \quad (5)$$

The $\varepsilon$ referred to in equations (3) and (4) is an error tolerance which is chosen a priori. It describes the maximum amount that the estimated function may deviate from the actual function described by the measured data.

The function that minimizes the functional described in (3) is: where $\alpha_i^*, \alpha_i \geq 0$ with $\alpha_i \alpha_i = 0$; and $(\Phi(x_i),\Phi(x))$ is the inner product of two elements of Hilbert space, where $\Phi(x)$ is defined as $\Phi(x) = (\Phi_1(x), \Phi_2(x) \ldots \Phi_k(x), \ldots )$.

$$f(x, \alpha, \alpha^*) = \sum_{i=1}^{l} (\alpha_i^* - \alpha_i)(\Phi(x_i), \Phi(x)) + b \quad (6)$$

Thus, in order to minimize the functional, coefficients $\alpha_i^*$ and $\alpha_i$ of equations (3) must be determined (step 16). This is done by solving the following quadratic optimization problem:

$$W(\alpha^*, \alpha) = -\varepsilon \sum_{i=1}^{l} (\alpha_i^* + \alpha_i) + \sum_{i=1}^{l} y(\alpha_i^* - \alpha_i) - \frac{1}{2} \sum_{i,j=1}^{l} (\alpha_i^* - \alpha_i)(\alpha_j^* - \alpha_j)(\Phi(x_i), \Phi(x_j)), \quad (7)$$

subject to the constraints:

$$\sum_{i=1}^{l} (\alpha_i^* - \alpha_i) = 0, \ 0 \leq \alpha_i, \alpha_i^* \leq C, \ i = 1, \ldots, l \quad (8)$$

With respect to the solution of equation (6), it is important to note that only some of the coefficients $\alpha_i^* - \alpha_i$ differ from zero. Also, in equation (6) the vectors $x_i$ are called Support Vectors ($SV_s$) and equation (6) is said to describe an expansion on these SVs.

In both equations (6) and (7), one can evaluate the inner products $(\Phi(x_i), \Phi(x))$ by using the general form of the inner product in Hilbert space. According to Hilbert space theory, to guarantee that a symmetric function K(u, v) has an expansion:

$$K(u, v) = \sum_{k=1}^{\infty} a_k \phi_k(u) \phi_k(v) \quad (9)$$

with positive coefficients $a_k > 0$, i.e. to guarantee that K(u, v) is an inner product in some feature space $\Phi$, it is necessary and sufficient that the conditions $$\int K(u,v) g(u) g(v) du dv > 0 \quad (10)$$

be valid for any non-zero function g on the Hilbert space (Mercer theorem). Therefore, equation (6) can be replaced with $$f(x, \alpha, \alpha^*) = \sum_{i=1}^{l} (\alpha_i^* - \alpha_i) K(x, x_i) + b \quad (11)$$

where the inner product $(\Phi(x_i), \Phi(x))$ is defined through a kernel $K(x_i, x)$. In which case, to find coefficients $\alpha_i^*$ and $\alpha_i$ one has to maximize the function:

$$W(\alpha^*, \alpha) = \quad (12)$$
$$-\varepsilon \sum_{i=1}^{l} (\alpha_i^* + \alpha_i) + \sum_{i=1}^{l} y(\alpha_i^* - \alpha_i) - \frac{1}{2} \sum_{i,j=1}^{l} (\alpha_i^* - \alpha_i)(\alpha_j^* - \alpha_j) K(x_i x_j)$$

subject to the constraints of equation (8).

Coefficients $\alpha_i^*$ and $\alpha_i$ are scalars, and therefore equation (11) may be rewritten as:

$$f(x) = \sum_{i=1}^{l} a_i K(x, x_i) + b \quad (13)$$

where $K(x, x_i)$ is a positively defined kernel function having two vector variables that define an inner product in some Hilbert space. The $a_i$ in equation (13) are scalars, and the $x_i$ are subsets of the measured data called support vectors. The number of terms required when approximating a function with the expansion of equation (13) depends on the complexity of the function being estimated and on the required accuracy of the approximation, but not on the dimensionality of the function being estimated.

Use of the Support Vector Method to Solve Linear Operator Equations

The SV method may be used for solving linear operator equations $$Af(t) = F(x) \quad (14)$$

where operator A realizes a one-to-one mapping from a Hilbert space $E_1$ into a Hilbert space $E_2$.

Instead of the function $F(x)$ on the right-hand side of (14) we are given measurements of this function, generally with errors.

$$(x_1, F_1), \ldots, (x_l, F_l). \quad (15)$$

It is necessary to estimate the solution of equation (14) from the data (15).

If the solution to (14) belongs to the set of function $f(t, w) \in \Phi$ linear in some flattening space $\{\phi_0(t), \ldots, \phi_N(t), \ldots\}$:

$$f(t, w) = \sum_{r=0}^{\infty} w_r \phi_r(t) = (W, \Phi(t)), \quad (16)$$

where we denote $W = (w_1, \ldots, w_N, \ldots),$ $\Phi(t) = (\phi_0(t), \ldots, \phi_N(t), \ldots).$ To use the SV technique we solve this equation by minimizing the functional $$D(f) = C \sum_{i=1}^{l} |Af - F_i|_\varepsilon + \gamma(W, W) \quad (17)$$

where the regularization term is defined by the same operator than defines the equation.

The operator A maps this set of functions into the set of functions $$F(x, w) = Af(x, w) = \sum_{r=0}^{\infty} w_r A\phi_r(t) = \sum_{r=0}^{\infty} w_r \psi_r(x) = (W, \Psi(x)), \quad (18)$$

which are linear in another flattening space $$\Psi(x) = (\psi_0(x), \ldots, \psi_N(x), \ldots) \quad (19)$$

where $$\psi_r(x) = A\phi_r(t). \quad (20)$$

To minimize functional (17) in the set of functions $f(t, w)$, it is sufficient to find the vector coefficients $W$, which minimizes the functional $$D_1(F) = C \sum_{r=0}^{l} |F(x_i) - F_i|_\varepsilon + (W, W) \quad (21)$$

in an image space that is in the space of functions $F(x_i, w)$. The generating kernel in the image space is defined as $$\mathcal{K}(x_i, x_j) = \sum_{r=0}^{\infty} \psi_r(x_i) \psi_r(x_j) \quad (22)$$

and the cross-kernel function is defined as $$\kappa(x_1, t) = \sum_{r=0}^{\infty} \psi_r(x_i) \phi_r(t). \quad (23)$$

The problem of finding the solution to the operator equation (finding the corresponding vector of coefficients $W$) is equivalent to the problem of finding vector $W$ for linear regression function (18) in the image space using measurements (15).

This regression problem may be solved using the quadratic optimization SV technique, maximizing the objective function (12) subject to constraint (8). The kernel (22) is used to find both the support vectors $x_i$, $i=1, \ldots, N$ and the corresponding coefficients $\alpha_i^* - \alpha_i$ that define the vector $W$ for SV regression approximation $$W = \sum_{i=1}^{N} (\alpha_i^* - \alpha_i) \psi(x_i) \quad (24)$$

It is sufficient to use the standard quadrative optimization SV technique. The coefficients $W$ with the regression in image space define the approximation to the desired solution, so inserting these coefficients into (16) yields $$f(t, \alpha, \alpha^*) = \sum_{i=1}^{N} (\alpha_i^* - \alpha_i)\kappa(x_i, t). \quad (25)$$

Solving of the operator equation thus involves using the cross-kernel function as an expansion on the support vector.

In order to solve the linear operator equation using the SV method, the following steps are taken:

1. Define corresponding regression problem in image space.
2. Construct the kernel function $K(x_i, x_j)$ for solving the regression problem using the SV method.
3. Construct the cross-kernel function $k(x_i, t)$.
4. Use the kernel function $K(x_i, x_j)$ to solve the regression problem by the SV method (i.e. to find the support vectors $x_1^*$, i=1, . . . , N and the corresponding coefficients $\beta_i = (\alpha_i^* - \alpha_i$, i=1, . . . N).
5. Use these supports vectors and corresponding coefficients to define the solution: In these five steps the first three steps (constructing the regression problem, constructing the kernel in the image space, and constructing the corresponding cross-kernel function) reflect $$f(t) = \sum_{r=1}^{N} \beta_r \kappa(x_r, t) \quad (26)$$

the singularity of the problem at hand (they depend on the operator A). The last two steps (solving the regression problem by the SV method and constructing the solution to the desired problem) are routine. However, a given operator equation must obtain explicit expressions for both the kernel function in image space and the corresponding cross-kernel function.

The solution of ill-posed operator equations requires additional steps. When solving the operator equation where only the approximation $F_l$ of the right-hand side $$Af = F \quad (27)$$

of (27) is given, the functional must be minimized in a set of functions $\{f\}$. In this $$W(f) = \|Af - F_l\|^2 + \gamma_l \Omega(f)$$

functional the term $\Omega(f)$ is the regularization functional and the parameter $\gamma_l$ is the regularization constant. The constant $\gamma_l$ is chosen using the discrepancy principle. If, for sufficiently large l, the accuracy of approximating function $F_l$ obtained from the data does not exceed $\epsilon$, then regularization function $\Omega(f)$ must be minimized subject to $$\|Af - F_l\| \leq \epsilon \quad (28)$$

By using a loss function insensitive to $\epsilon$, the SV method of solving operator equation applies this principle. For sufficiently large C, the SV method minimizes the regularization functional, which is the norm of the vector of coefficients of the linear function in flattening space subject to constraint (28).

Where detailed information on accuracy of the approximation is available, the regularization process may be better controlled. Data describing the right-hand side of (27) may be obtained simultaneously with an estimate of the accuracy of obtaining data at any specific set of points. In other words, the operator equation is solved given triples $$(x_1, F_1, \epsilon_1), \ldots, (x_l, F_l, \epsilon_l). \quad (29)$$

Thus, using various $\epsilon$-insensitivities for various points (vectors) x, the regularization process may be better controlled.

Figure 2:
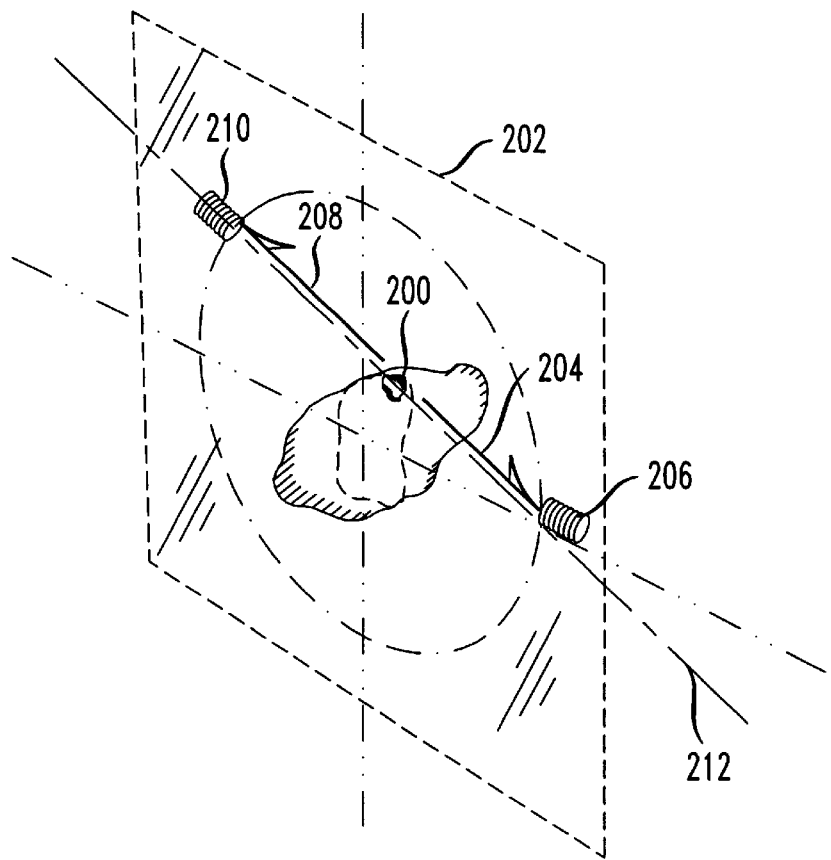
FIG. 2 shows the geometry of a two dimensional Positron Emission Tomography (PET) scan machine.

Use of the Support Vector Method to Estimate Functions Generated by Positron Emission Tomography Positron Emission Tomography (PET) is medical diagnostic technique which involved the reconstruction of radio activity within the body following the injection or inhalation of a tracer labeled with a positron emitting nuclide. During the disintegration of the radioactive nuclei collected in the body, positrons are emitted. These positrons collide with nearby electrons resulting in the annihilation of the electron and positron and the emission of two gamma rays in opposite directions. FIG. 2 shows the detection of the gamma rays on opposite sides of the radioactive source. From each point within the source 200, the gamma ray pair can be emitted in any direction. Two-dimensional PET, however, measures only rays that belong to a fixed plane 202. In this plane if gamma ray 204 hits a first detector 206 and then within a small time interval another gamma ray 208 hits the opposite dectector 210, then it is known that an emission must have originated from a point somewhere along the line joining these two detectors, the line of response 212. This event is known as a coincidence. The total number of coincidences for this pair of detectors is proportional to the integral of the tracer concentration along line of response 212. In order to obtain information about the tracer distribution in the plane, PET devices include a large number of detector pairs with lines of response at many different angles. The set of all detector pairs whose lines of response are at a given angle $\mu$ form a $\mu$-projection. A sinogram contains the set of all projections. At present, a typical PET device includes between 100 and 300 projection angles, $\mu_j$, with each projection having between 100 and 200 lines of response $m_i$. This gives between 10,000 and 60,000 lines of response, each with corresponding recorded number of coincidences $p(m_k, \mu_k)$. Thus, the data includes l triplets $m_k, \mu_k, p(m_k, \mu_k)$ called observations in each sinogram. The object is to reconstruct the density of nuclear concentration within a given plane of the body using the sinogram.

Figure 3:
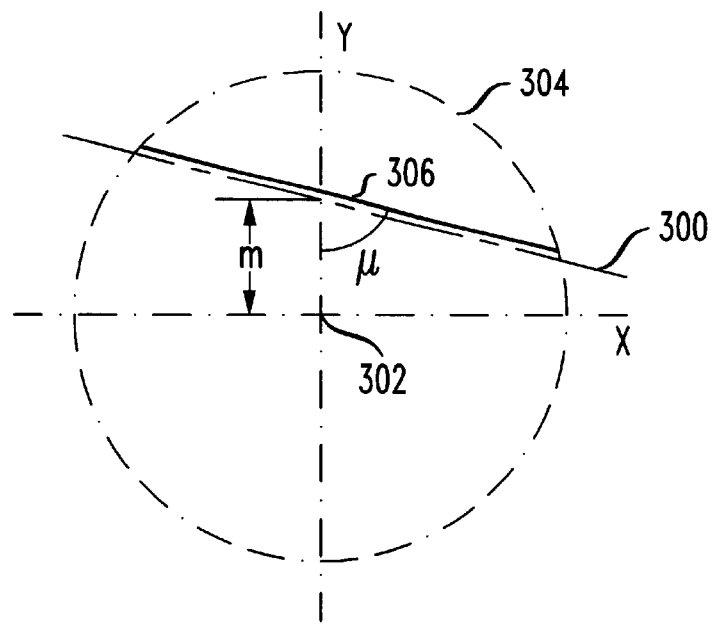
FIG. 3 shows the basic geometry of the PET scan image reconstruction problem.

FIG. 3 shows a line or response 300 inclined at angle $\mu$ to the y axis and at distance m from the origin 302. The detector circle 304 is assumed to have a radius=1. Coincidence count $p(m, \theta)$ is proportional to integral of concentration function $f(x,y)$ along a line 306 defined by a pair $m, \mu$. The Radon operator R defines the integral of $f(x,y)$ along any line $$R[f(x, y)] = \quad (30)$$
$$\int_{-\sqrt{1-m^2}}^{\sqrt{1-m^2}} f(m\cos\mu + u\sin\mu, m\sin\mu - u\cos\mu) du = p(m, \mu),$$

where coordinates x, y along the line are defined by equations $$x = m \cos \mu + u \sin \mu$$

$$y = m \sin \mu - u \cos \mu \quad (31)$$

and the position of the line is defined by parameters $$-1 < m < 1, \ 0 \leq \mu \leq \pi. \quad (32)$$

The interval of integration is defined by $$-a_m = -\sqrt{1-m^2} \leq u \leq \sqrt{1-m^2} = +a_m \quad (33)$$

The principal advantage of the use of the Radon transform operator to find the function f(x,y) that satisfies (30) given the function p(m,θ) is that under wide conditions inverse operator $$R^{-1}R[f(x,y)]=R^{-1}p(m,u)=f(x,y) \quad (34)$$

exists. In order words, the solution to the Radon equation exists. However, the finding of this solution is an ill-posed problem.

The object is to find the solution to this ill-posed problem in a situation where function p(m,θ) is defined by its values $p_k$ in a finite number l of points $m_k, u_k$, k=1, ... l. Moreover, the data points are corrupted by some random noise $$p_k = p(m_k, u_k) \quad (35)$$

The object is to solve the PET Radon equation (30) given measurements $$(p_1, m_1, \mu_1), \ldots, (p_l, m_l, \eta_l) \quad (36)$$

which is a stochastic ill-posed problem.

In order to find the solution to the operator equation $$Af(t)=F(x) \quad (37)$$

using approximation $F_l(x)$ instead of exact right hand side $F(x)$ of (37), the regularized functional $$R=\|Af(t)-F_*(x)\|^2+\gamma\Omega(f), \quad (38)$$

must be minimized in a given set of functions $\{f(t)\}$, where $\gamma>0$ is some regularization constant and $\Omega(f)$ is a regularizing functional.

In the PET problem, where a finite number of measurements are given, the following functional may be constructed: The set of functions in which one looking for the solution may be selected from piece-wise constant or piece-wise linear functions $\{f(x,y)\}$.

$$R(f) = \sum_{k}^{l}\left(P_k - \int_{-1}^{1} f(m_k\cos\mu_k + u\sin\mu_k, m_k\sin\mu_k - u\cos\mu_k)du\right)^2 + \gamma\Omega(f) \quad (39)$$

The residual method may be applied to solve an integral equation with the right-hand side of the equation approximately defined. If the linear operator equation (31) is to be solved with approximation $F_l(x)$ instead of exact equation $F(x)$, and information about the accuracy of the approximation $$\Delta = \|F(x)-F_l(x)\|. \quad (40)$$

is available, the residual method suggests the choice of $f_\gamma(t)$ which minimizes the functional $\|f\|^2$ and satisfies the constraint $$\|Af_\gamma(t)-F_l(x)\| \leq \Delta \quad (41)$$

For PET image reconstruction, the exact value of $\Delta$ cannot be evaluated, because it is the result of measurement of a random event in which stochastical accuracy is characterized by the variance. The random value of the number of coincidences along any line of response may be characterized as $$\epsilon_k = \sqrt{p(m_k, \mu_k)}. \quad (42)$$

For PET image reconstruction the functional $\|f\|^2$ is minimized subject to constraints $$\left|p_k - \int_{-a_m}^{+a_m} f_\gamma(m_k\cos\mu_k + u\sin\mu_k, m_k\sin\mu_k - u\cos\mu_k)du\right| \leq \delta\varepsilon_k \quad (43)$$

where δ>0 is some constant. As described above, the SV method with a ε-insensitive loss function (with different $\epsilon_i$ for different vectors $x_i$) is an appropriate method for solving such problems.

Prior art solution methods of solving the PET image reconstruction problem find the solution in a set of piece-wise constant functions. For this purpose the n×n=N pixel space was introduced where in any pixel the value of function was considered to be constant. If l is the number of measurements, the integral equation (30) was approximated by the algebraic equation $$Ax=b, x\geq 0, \quad (44)$$

where $A \in R^{l\times N}$ was a known matrix, $x \in R^N$ was a vector defined the values of the approximating function in the set of pixels, and $b \in R^l$ was a vector that defined the number of coincidences along lines of response.

The regularized method for solution of equation (44) proceeded by minimizing the functional $$R=(b-Ax)(b-Ax)^T+\Omega(x), \quad (45)$$

where the regularizer $\Omega(x)=(x,x)$ was used. Other regularizers were also used.

Use of the strong residual principle for solving this problem led those in the prior art to choose a regularization parameter γ for which the solution x* of the optimization problem (44) minimized the functional (x,x) and satisfied the constraints $$\left|b_k - \sum_{i=1}^{l} a_{i,k}x_k^*\right| \leq \varepsilon_k, \quad (46)$$

where $b_x$ is coordinate of vector b, $b_i^*$ is coordinate of vector x*, and $a_{i,k}$ is element of matrix A.

The main problem with this prior art method of solving the PET image reconstruction problem is the computational power required for solving an equation this large. As described above, M may be as large as 60,000 observations and the number of parameters to be estimated N may also be approximately 60,000 (N=256×256). The prior art methods of solving the PET image reconstruction problem considered various methods of solving this equation, but to date only the SV method does not require the reduction of the problem to solving of the system of linear algebraic equations with a very large number of variables.

In accordance with the present invention, solutions to the PET image reconstruction problem may be sought in the set of two dimensional tensor-product spline functions built from one dimensional splines with knot sequence $$\{t_i\}_{i=i}^{N}.$$

The knot spacing may be chosen as small as the resolution of the application requires; increasing the resolution in this way has very little effect on the number of support vectors, and hence on the difficulty of obtaining the solution. To simplify the formulas, piece-wise constant functions are considered. The construction of higher order splines is analogous. The desired function may be approximated by the expression $$f(x, y) = \sum_{i,j} \psi_{i,j} \theta(x - t_i)\theta(y - t_j) \qquad (47)$$

where $\psi_{i,j}$ are the expression coefficients and $\theta$ is the Heaviside step function.

Transforming this function with the Radon operator R yields the corresponding regression problem in image space $$p(m, u) = \sum_{i,j} \Psi_{i,j} \phi(m, \mu, t_i, t_j) \qquad (48)$$

where we have set $$p(m,u)=(Rf)(m,u)$$

$$\phi(m,u)=(R\theta(-t_i)\theta(-t_j))(m,u). \qquad (49)$$

The problem of solving the PET image reconstruction equation in the set of piece-wise constant functions is reduced to the problem of regression approximation in the image space using the data $$\{p_i, m_i, \mu_i\}_{i=1}^l.$$

The solution requires finding the constants $\psi_{i,j}$ that satisfy the conditions $$\left| p_k = \sum_{i,j} \psi_{i,j}\phi(m_k, \mu_k, t_i, t_j) \right| \le \delta\epsilon_k$$

and has a minimal norm. In the present invention, this is done by minimizing (21) to obtain the solution of the PET image reconstruction problem. In order to accomplish this, we must construct two functions: the kernel function in image space $$K(m_i, \mu_i, m_j, \mu_j) = \sum_{\alpha,\beta} \phi(m_i, \mu_i, t_\alpha, t_\beta)\phi(m_j, \mu_j, t_\alpha, t_\beta) \qquad (50)$$

and the cross-kernel function $$\kappa(m_i, \mu_i, x, y) = \sum_{\alpha,\beta} \phi(m_i, \mu_i, t_\alpha, t_\beta)\phi(x - t_\alpha)\phi(y - t_\beta) \qquad (51)$$

These expressions may easily be evaluated analytically.

To solve the PET image reconstruction problem using the SV technique, two steps remain. First, the kernel-function (50) is used to obtain the support vectors $(m_k, \mu_k)$, k=1, ..., N and corresponding coefficients $\alpha^*_k - \alpha_k$, k=1, ... N. Second, the cross-kernel function (51) is used to obtain support vectors and coefficients that define the desired image reconstruction approximation $$f(x, y) = \sum_{k=1}^{T} (\alpha^*_k - \alpha_k)\kappa(m_k, \mu_k; x, y) \qquad (52)$$

Note that for any support vector $(m_k, \mu_k)$ in image space there is a corresponding line of response in pre-image space defined by expression $x = m_k \cos \mu_k + u \sin \mu_k$ $y = m_k \sin \mu_k - u \cos \mu_k$ $$\sqrt{1-m_k^2} \le u \le \sqrt{1-m_k^2} \qquad (53)$$

Therefore, in pre-image space the expansion of the function using support vectors $(m_k, \mu_k)$, k=1, ..., N is equivalent to the expansion of the desired solution on the lines of response.

Figure 4:
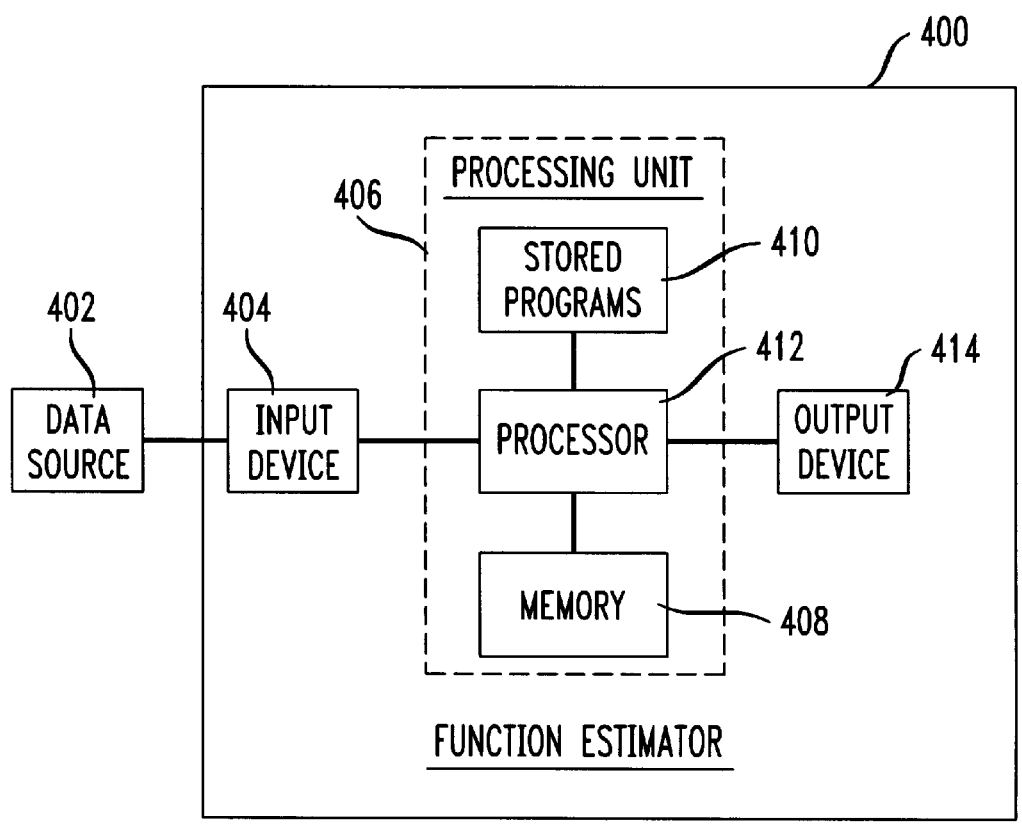
FIG. 4 is a block diagram of a system for estimating real functions according to the present invention.

FIG. 4 is a block diagram of a system for estimating real functions according to the present invention. As mentioned above, the function being estimated will generally describe an "n" dimensional phenomenon of which "l" measurements have been taken. In the system of FIG. 5, these measurements are provided to a function estimator 400 through a data source 402. The data source 402 may be a set of PET detectors. The estimator operates on the measured data to generate the estimating function.

The data source and function estimator may take many forms. For example, the data source may be the measuring instrument used to generate the measured data, or it may merely be a storage device, such as a disk drive, where measured data is stored. The function estimator may be computer, such as a personal computer, or it may be a single circuit board, such as an expansion board for a personal computer.

In any event, the function estimator includes an input device 404 that receives the measurements from the data source. An example of an input device is an RS-232 port (commonly available on many personal computers). The input device, in turn, relays the measurements to a processing unit 406, where the estimation process of forming a functional, minimizing the functional, and determining the coefficients of the minimizing function is implemented.

In a preferred embodiment, the processing unit includes a memory 408, one or more stored programs 410, and a processor 412. The memory is used to store measurement data received through the input device. It may be, for example, the Random Access Memory (RAM) of a computer. The stored programs are those programs necessary for implementing the estimation process. They may be stored in the Read Only Memory (ROM) of a computer. The processor, which may be the Central Processing Unit (CPU) of a computer, implements the estimation process according to instructions set forth in the stored programs.

In a preferred embodiment, the function estimator includes an output device 414. The output device is used to provide information to the user of the function estimator by, for example, providing a plot of the estimated function superimposed on a plot of the measured data. An example of an output device suitable for use with the invention is a computer display monitor.

Several embodiments for the invention have been described in detail. However, it should be obvious that there are many further variations evident to persons skilled in the art. The invention is more particularly defined in the appended claims.

We claim:

1. A system for estimating a real function that describes a phenomenon occurring in a space of any dimension, comprising:
   an input device for receiving a plurality of measurements of the phenomenon;
   one or more stored programs that include instructions for:
      defining a kernel function using support vectors that defines an inner product in Hilbert space;
      defining a cross-kernel function corresponding to said kernel function;
      using said measurements, said kernel function, and a chosen error tolerance to form a functional;
      minimizing said functional to find a plurality of coefficients and a plurality of support vectors, said coefficients and said support vectors corresponding on a one-to-one basis; and
      forming an expansion from said cross-kernel, said coefficients, and said support vectors, said expansion having a plurality of terms, each term including a first multiplier that is said cross-kernel function as defined by one of said support vectors and a second multiplier that is said coefficient corresponding to said one of said support vectors, whereby said expansion forms an estimate of the real function;
   a processor for executing said instructions; and
      an output device for displaying the results of said function estimation.

2. The invention of claim 1, further comprising a data source for transmitting said measurements to said input device.

3. The invention of claim 1, wherein said input device is an RS-232 port.

4. The invention of claim 1, further comprising a memory for receiving said measurements from said input device and storing said measurements for retrieval by said stored programs.

5. The invention of claim 4, wherein said memory is a Random Access Memory of a computer.

6. The invention of claim 1, wherein said output device is a computer monitor.

7. The invention of claim 1, wherein said stored programs are stored in a Read Only Memory of a computer.

8. The invention of claim 1, wherein the phenomenon occurring in a space of any dimension is a Positron Emission Tomography scan.

9. A function estimator for estimating a real function that describes a phenomenon occurring in a space of any dimension, comprising:
   an input device for receiving a plurality of measurements of the phenomenon;
   a processing unit for:
      defining a kernel function using support vectors that defines an inner product in Hilbert space;
      defining a cross-kernel function corresponding to said kernel function;
      using said measurements, said kernel function, and a chosen error tolerance to form a functional;
      minimizing said functional to find a plurality of coefficients and a plurality of support vectors, said coefficients and said support vectors corresponding on a one-to-one basis; and
      forming an expansion from said cross-kernel, said coefficients, and said support vectors, said expansion having a plurality of terms, each said term including a first multiplier that is said cross-kernel function as defined by one of said support vectors and a second multiplier that is said coefficient corresponding to said one of said support vectors, whereby said expansion forms an estimate of the real function;
   an output device for displaying the results of said function estimation.

10. The invention of claim 9, further comprising a data source for transmitting said measurements to said input device.

11. The invention of claim 9, wherein said input device is an RS-232 port.

12. The invention of claim 9, further comprising one or more stored programs for controlling the operation of said processing unit.

13. The invention of claim 12, further comprising a memory for storing said stored programs.

14. The invention of claim 13, wherein said memory is a Read Only Memory of a computer.

15. The invention of claim 9, wherein said output device is a computer monitor.

16. The invention of claim 9, further comprising a memory for receiving said measurements from said input device and storing said measurements for retrieval by said processing unit.

17. The invention of claim 16, wherein said memory is a Random Access Memory of a computer.

18. The invention of claim 9, wherein the phenomenon occurring in a space of any dimension is a Positron Emission Tomography scan.

19. A method for estimating a real function that describes a phenomenon occurring in a space of any dimension, comprising:
   taking a plurality of measurements of the phenomenon;
   receiving the plurality of measurements from an input device;
   defining a kernel function that defines an inner product in Hilbert space;
   defining a cross-kernel function corresponding to said kernel function;
   using said measurements, said kernel function, and a chosen error tolerance to form a functional;
   minimizing said functional to find a plurality of coefficients and a plurality of support vectors, said coefficients and said support vectors corresponding on a one-to-one basis;
   forming an expansion from said cross-kernel, said coefficients, and said support vectors, said expansion having a plurality of terms, each term including a first multiplier that is said cross-kernel function as defined by one of said support vectors and a second multiplier that is said coefficient corresponding to said one of said support vectors; defining a spline-generating kernel function that defines an inner product in Hilbert space, whereby said expansion forms an estimate of the real function; and
   displaying the results of said function estimation.

20. The invention of claim 19, wherein said method is implemented by a computer.

21. The invention of claim 19, wherein the phenomenon occurring in a space of any dimension is a Positron Emission Tomography scan.

22. A system for estimating a real function that describes a phenomenon occurring in a space of any dimension, comprising:
   an input device for receiving a plurality of measurements of the phenomenon;

one or more stored programs that include instructions for:
defining a kernel function using support vectors that defines an inner product in Hilbert space;
defining a cross-kernel function corresponding to said kernel function;
using said measurements, said kernel function, and a chosen error tolerance to form a functional;
minimizing said functional to find a plurality of coefficients and a plurality of support vectors, said coefficients and said support vectors corresponding on a one-to-one basis;
forming an expansion from said cross-kernel, said coefficients, and said support vectors, said expansion having a plurality of terms, each said term including a first multiplier that is said cross-kernel function as defined by one of said support vectors and a second multiplier that is said coefficient corresponding to said one of said support vectors; whereby said expansion forms an estimate of the real function; and
a processor for executing said instructions.

23. A function estimator for estimating a real function that describes a phenomenon occurring in a space of any dimension, comprising:
an input device for receiving a plurality of measurements of the phenomenon;
a processing unit for:
defining a kernel function using support vectors that defines an inner product in Hilbert space;
defining a cross-kernel function corresponding to said kernel function;
using said measurements, said kernel function, and a chosen error tolerance to form a functional;
minimizing said functional to find a plurality of coefficients and a plurality of support vectors, said coefficients and said support vectors corresponding on a one-to-one basis; and
forming an expansion from said cross-kernel, said coefficients, and said support vectors, said expansion having a plurality of terms, each said term including a first multiplier that is said cross-kernel function as defined by one of said support vectors and a second multiplier that is said coefficient corresponding to said one of said support vectors, whereby said expansion forms an estimate of the real function.

24. A method for estimating a real function that describes a phenomenon occurring in a space of any dimension, comprising:
taking a plurality of measurements of the phenomenon;
defining a kernel function that defines an inner product in Hilbert space;
defining a cross-kernel function corresponding to said kernel function;
using said measurements, said kernel function, and a chosen error tolerance to form a functional;
minimizing said functional to find a plurality of coefficients and a plurality of support vectors, said coefficients and said support vectors corresponding on a one-to-one basis; and
forming an expansion from said cross-kernel, said coefficients, and said support vectors, said expansion having a plurality of terms, each said term including a first multiplier that is said cross-kernel function as defined by one of said support vectors and a second multiplier that is said coefficient corresponding to said one of said support vectors, whereby said expansion forms an estimate of the real function.

* * * * *